(12) United States Patent
Tischart

(10) Patent No.: US 11,057,502 B2
(45) Date of Patent: *Jul. 6, 2021

(54) CLOUD ASSISTED BEHAVIORAL AUTOMATED TESTING

(71) Applicant: McAfee, LLC, Santa Clara, CA (US)

(72) Inventor: James Tischart, Parker, CO (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,460

(22) Filed: Feb. 20, 2020

(65) Prior Publication Data

US 2020/0267242 A1     Aug. 20, 2020

Related U.S. Application Data

(63) Continuation of application No. 15/200,969, filed on Jul. 1, 2016, now Pat. No. 10,582,021.

(51) Int. Cl.
*H04L 29/06*     (2006.01)
*H04L 12/26*     (2006.01)
(Continued)

(52) U.S. Cl.
CPC .............. *H04L 69/161* (2013.01); *G06F 8/30* (2013.01); *G06F 8/70* (2013.01); *G06F 11/368* (2013.01);
(Continued)

(58) Field of Classification Search
CPC ......... H04L 67/02; H04L 67/10; H04L 67/22; H04L 67/306; H04L 43/50; H04L 43/0817; H04L 43/0876; H04L 43/16; H04L 41/5038; H04L 41/08; H04L 41/0803; H04L 41/0823; H04L 45/02; H04L 51/02; H04L 63/1433; H04L 63/1416;
(Continued)

(56) References Cited

U.S. PATENT DOCUMENTS 8,196,113 B2    6/2012 Miller et al.
8,473,519 B1    6/2013 Siddiqui et al.
(Continued)

OTHER PUBLICATIONS

International Searching Authority, "International Search Report and Written Opinion," mailed in connection with International Patent Application No. PCT/US2017/034282, dated Sep. 28, 2017, 13 pages.

(Continued)

*Primary Examiner* — Ruolei Zong
(74) *Attorney, Agent, or Firm* — Hanley, Flight & Zimmerman, LLC

(57) ABSTRACT

A computer readable storage medium, system and method for improving automated testing systems to include a first and second behavioral data. The first behavioral data is collected periodically and the second behavioral data is collected in real time. The receipt of the first behavioral data and a second behavioral data are followed by the receipt of a system configuration template. A test case is updated based on the first and second behavioral data, and an automated test environment is reconfigured based on the first behavioral data, second behavioral data, and the system configuration template. The test executes in the automated test environment producing a test result.

21 Claims, 6 Drawing Sheets

(51) Int. Cl.
| | |
|---|---|
| *H04L 29/08* | (2006.01) |
| *G06N 20/00* | (2019.01) |
| *G06F 16/00* | (2019.01) |
| *G06F 16/21* | (2019.01) |
| *G06F 16/951* | (2019.01) |
| *G06F 16/2458* | (2019.01) |
| *G06F 11/36* | (2006.01) |
| *G06F 8/30* | (2018.01) |
| *G06F 8/70* | (2018.01) |
| *G06F 21/56* | (2013.01) |
| *H04L 12/24* | (2006.01) |
| *H04L 12/751* | (2013.01) |
| *G06F 8/41* | (2018.01) |

(52) U.S. Cl.
CPC ...... *G06F 11/3664* (2013.01); *G06F 11/3684* (2013.01); *G06F 11/3692* (2013.01); *G06F 16/00* (2019.01); *G06F 16/214* (2019.01); *G06F 16/2462* (2019.01); *G06F 16/951* (2019.01); *G06F 21/566* (2013.01); *G06N 20/00* (2019.01); *H04L 41/0803* (2013.01); *H04L 41/0813* (2013.01); *H04L 41/0853* (2013.01); *H04L 41/0856* (2013.01); *H04L 41/0869* (2013.01); *H04L 41/0889* (2013.01); *H04L 43/50* (2013.01); *H04L 45/02* (2013.01); *H04L 63/08* (2013.01); *H04L 67/02* (2013.01); *H04L 67/10* (2013.01); *H04L 67/22* (2013.01); *H04L 67/306* (2013.01); *G06F 8/42* (2013.01); *G06F 8/423* (2013.01); *G06F 8/425* (2013.01); *G06F 8/427* (2013.01); *G06F 21/564* (2013.01); *H04L 43/06* (2013.01)

(58) Field of Classification Search
CPC ............... H04L 69/161; G06F 11/3688; G06F 11/3664; G06F 11/3409; G06F 11/3692; G06F 11/079; G06F 11/3457; G06F 11/3612; G06F 11/3668; G06F 11/263; G06F 11/30; G06F 11/3051; G06F 11/3055; G06F 17/5009; G06F 21/577; G06F 2221/033
USPC ...................................................... 709/204
See application file for complete search history.

(56) References Cited

U.S. PATENT DOCUMENTS

| | | | |
|---|---|---|---|
| 9,141,522 B1 | 9/2015 | Zias | |
| 9,419,884 B1* | 8/2016 | Li | ............................ H04L 43/50 |
| 9,606,900 B1 | 3/2017 | Pradhan et al. | |
| 2005/0075842 A1* | 4/2005 | Ormazabal | ......... H04L 63/1433 |
| | | | 702/188 |
| 2006/0247885 A1 | 11/2006 | Manfredi | |
| 2007/0081543 A1 | 4/2007 | Brenes et al. | |
| 2008/0155338 A1 | 6/2008 | Rusmanov | |
| 2008/0244523 A1 | 10/2008 | Kelso | |
| 2009/0177567 A1* | 7/2009 | McKerlich | ............. G06Q 20/10 |
| | | | 705/35 |
| 2010/0003923 A1* | 1/2010 | McKerlich | ............ H04M 15/70 |
| | | | 455/67.11 |
| 2010/0036911 A1 | 2/2010 | Sankaran | |
| 2011/0196853 A1 | 4/2011 | Bigham et al. | |
| 2011/0302647 A1 | 12/2011 | Bhattacharya et al. | |
| 2012/0131591 A1* | 5/2012 | Moorthi | .................. H04L 67/10 |
| | | | 718/104 |
| 2014/0109053 A1 | 4/2014 | Vasudevan et al. | |
| 2014/0359362 A1* | 12/2014 | Lu | ....................... G06F 11/3684 |
| | | | 714/33 |
| 2015/0163199 A1* | 6/2015 | Kailash | ............... H04L 63/1425 |
| | | | 726/11 |
| 2016/0134653 A1* | 5/2016 | Vallone | ................. H04L 41/046 |
| | | | 726/25 |
| 2016/0294606 A1 | 10/2016 | Puri et al. | |
| 2017/0344641 A1 | 11/2017 | Parkunan et al. | |
| 2018/0007175 A1 | 1/2018 | Tischart | |

OTHER PUBLICATIONS

United States Patent and Tradmark Office, "Notice of Allowance," mailed in connection with U.S. Appl. No. 15/200,969, dated Oct. 28, 2019, 9 pages.
United States Patent and Tradmark Office, "Final Office Action," mailed in connection with U.S. Appl. No. 15/200,969, dated Jun. 25, 2019, 18 pages.
United States Patent and Tradmark Office, "Non-final Office Action," mailed in connection with U.S. Appl. No. 15/200,969, dated Jan. 12, 2018, 23 pages.
European Patent Office, "Communication Pursuant to Article 94(3) EPC," mailed in connection with European Patent Application No. 17728369.4, dated Jul. 16, 2020, 8 pages.

* cited by examiner

CLOUD ASSISTED BEHAVIORAL AUTOMATED TESTING

RELATED APPLICATION

This patent arises from a continuation of U.S. patent application Ser. No. 15/200,969, entitled "CLOUD ASSISTED BEHAVIORAL AUTOMATED TESTING," and filed on Jul. 1, 2016. U.S. patent application Ser. No. 15/200,969, now U.S. Pat. No. 10,582,021, is incorporated herewith in its entirety.

TECHNICAL FIELD

Embodiments described herein generally relate to automated systems testing, and more specifically to automated systems testing utilizing dynamic behavioral inputs.

BACKGROUND ART

As more computing systems are being deployed, the providers of those systems attempt to provide a good user experience from product release to product release. Inevitably, bugs are discovered by users. Once the bugs are identified and fixed, test cases are developed to exercise the product and verify that the bug has been corrected, without introducing new errors.

The development and execution of these test cases may be difficult to create and tedious to execute. Attempts have been made to automate some of these processes using control systems and software. Test cases are developed and executed in controlled testing environments that provide the ability to soak test systems over long periods of time, or regression test systems to validate that prior fixes are not undone.

However, as computer systems grow more complex, the test cases may become stagnant and fail to handle relevant user input and behavior.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

The usage of the term "send" or "sending" may refer to any transmission across a medium suitable for the data being transmitted. Mediums suitable for being transmission mediums include but are not limited to fiber channel, coaxial, wireless, and Ethernet. Additionally, any accompanying protocols commonly utilized for their respective medium may also be inferred from the transmission. This would include but not be limited to 802.11 and 802.3 standards, as well as higher open system interconnection stack protocol layers including TCP/IP, and UDP.

The cloud assisted behavioral automated testing system integrates behavioral data to replicate system configurations "in the wild" and user behavior with those systems to create a more realistic testing scenario. The cloud assisted behavioral automated testing system aggregates behavioral data from multiple sources, updates test cases based on the behavioral data, sets the usage pattern for the input based on a system configuration template, and finally executes the test cases in a controlled testing environment.

Figure 1:
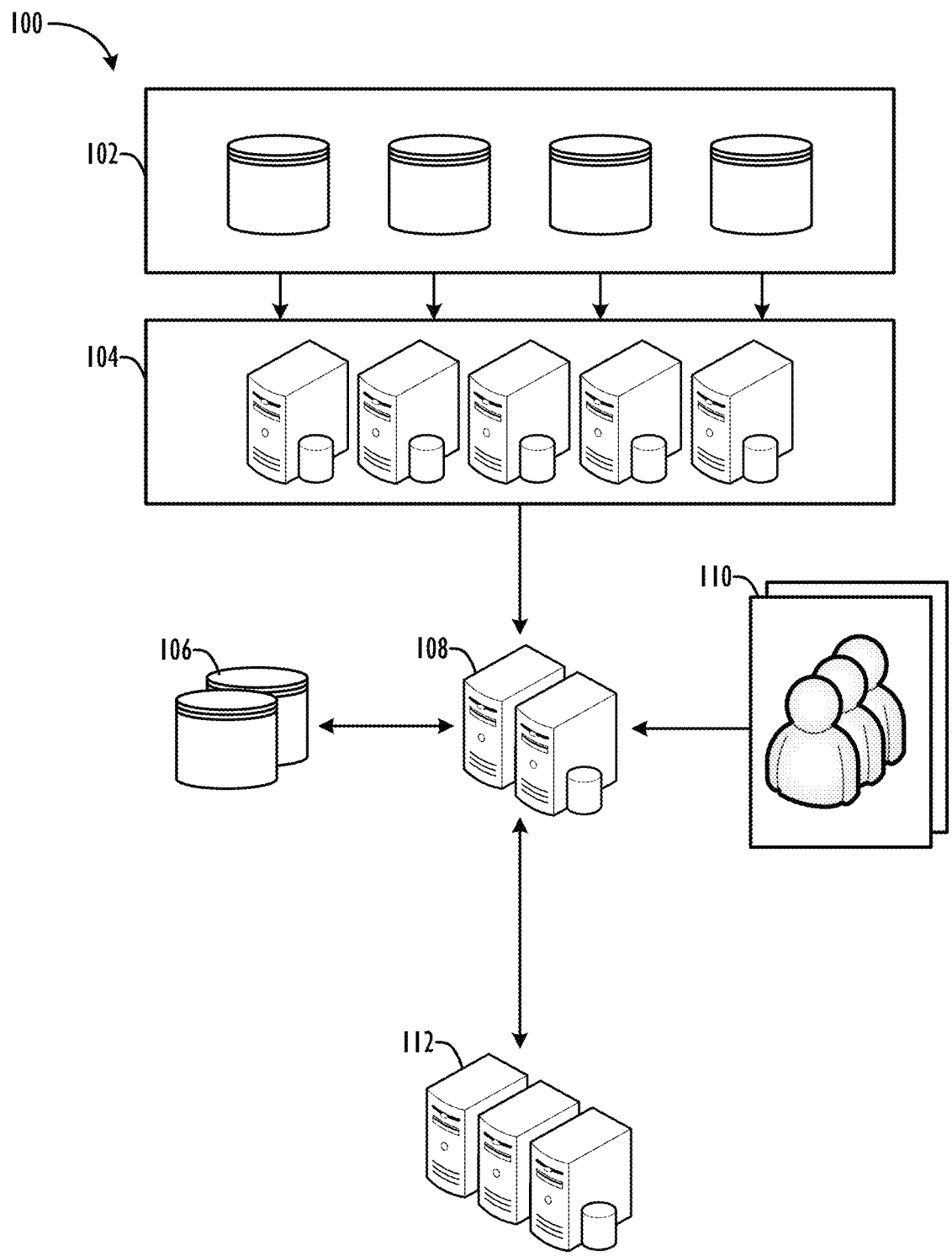
FIG. 1 is a block diagram illustrating a cloud assisted behavioral automated testing system according to one or more embodiments.

FIG. 1 is a block diagram illustrating a cloud assisted behavioral automated testing system (BATS) 100 according to one or more embodiments. Behavioral data collection services 102 provide a first set of behavioral data into the BATS. The behavioral data collection services provide the raw data that form the basis of that behavioral data. Behavioral data collection services may be responsible for querying hardware information, software information, locational information, as well usage information from a set of targeted computing devices. Computing devices may include other computer systems, as well as mobile devices such as mobile phones, tablets, laptops, automotive computing devices, and even wearable computing devices. The behavioral data collection services query many systems capable of providing data points from the set of targeted computing devices.

Behavioral logic aggregators 104 process the input received from the behavioral data collection services 102. The behavioral logic aggregators may be a single computer or a system of computers interconnected to each other and to the behavioral data collection service 102 The behavioral logic aggregators 104 utilize the data received to form patterns of behavior by which a test may be executed against. For example, the data received by the behavioral logic aggregators 104 may be broken into aggregated application data, usage data, threat data, and real time data. Application data may be a statistical occurrence of an application's installed base, or a set of applications across an installed base. For example, the application data may include statistical information related to the percentage of a word processor installation across the entire sample set. Alternatively, the application data may include statistical information, such as information related to the percentage of the same word processor installed across the sample set, further differentiated by version levels of the word processing application. An example data point in the set of behavioral data may include that a word processor application is installed locally, the installed word processor software revision is 1.0, and the word processor application at this revision is installed across 80% of the collected data points from the behavioral collection data services 102.

Additionally the behavioral logic aggregators 104 may aggregate data points from the behavioral data collection services 102 based on usage patterns. Usage patterns may include how frequently a certain application or feature is utilized. Usage patterns may also include the times of the day that a certain application or feature is utilized. For example a usage pattern may aggregate data points indicating that the word processor application was utilized 6% of the time across the all data points. In another example, the usage patterns may include information indicating that a spreadsheet application was utilized 4% after 6 p.m. local time.

Threat data is an additional metric that the behavioral logic aggregators 104 may aggregate. Threat data corresponds to data extracted from the behavioral data collection services 102 indicating of a security threat. Security threats may include, but are not limited to, malware, phishing attacks, and other security threats. The threat data, as aggregated through the behavioral logic aggregators 104, presents a data point against which the BATS can test software. The application data, usage data, and threat data, while definitely changing over time, are not that dynamic in the short term. These sets of behavioral data may be updated on a less frequent basis than the real time data. Although only application data, usage data, and threat data are referred to above, other types of data may be collected into aggregate collections as desired.

In one embodiment, uniform resource locator (URL) or real time data may also be extracted from the second set of behavioral data. The real time data is acquired from the behavioral data collection services 102 on a more frequent basis than the data types described above, and is representative of real security threats that the behavioral data collection services 102 have detected through the reporting devices. Real time data may include URLs pointing to phishing sites as well as suspicious URLs. The real time data may be aggregated more frequently than the application, usage, and threat data, as the real time data changes very frequently.

The BATS 100 may have a centralized control process system 108. The centralized control process system 108 may be a computer system of one or more interconnected computers. The centralized control process system 108 may take responsibility for orchestrating various other components inputs and outputs. The centralized control process system 108 may be connected and configured to receive aggregated behavioral data from the behavioral logic aggregators 104. The centralized control process system 108 may also be connected to a repository 106 of test cases and configured to receive, update, and transmit the updated test cases back to the repository 106. Additionally the centralized control process system 108 may create new test cases and transmit the new test cases to the repository 106 for storage and later retrieval. The centralized control process system 108 may be configured to receive system configuration templates 110 based on user personas. Finally, the centralized control process system 108 may be connected to a computer system or a server farm utilized as a automated test environment 112.

Test case repository 106 is the common area for the storage of test cases. The repository 106 may take any data structure, so long as the form provides a clear way to identify the test case, the inputs, the expected outputs, and a success condition. The repository 106 may be implemented as a database stored in memory, occasionally synchronized to a non-volatile storage unit. It may also be implemented in a flat file, with a well-defined structure that may be parsed when needed by the centralized control process system 108. The well-defined structure may include syntaxes and grammars defined by a common standard-based language. Extensible markup language (XML) may be used as it is a standards-based grammar that has the underlying structure required to define a test case.

The system configuration templates 110 are crafted based on user personas. The user personas may define patterns of usage for an execution test case. The patterns of usage may be defined based on the particular role the user persona is playing. Roles may include but are not limited to consumer roles, and enterprise roles. The roles define various aspects of the usage pattern, including applications utilized, frequency of the application utilization, and time of day of their utilization. For example, consumer roles may provide more activity during the evening time based on the usage patterns of consumers upon returning home from work. Consumer role activity may include web browser usage, web email, and video gaming. Alternatively, the enterprise role may provide activity patterns during the work day, and may include work related activities. Work related activities may be word processing and corporate email usage. Additionally the role activity may indicate not just the set of time periods, but also a data rate associated with the role. Consumer role activity may be very web browser intensive, sending many requests for pages in a shorter amount of time. Enterprise roles may utilize less web browser data in the same period of time.

The automated test environment 112 is a computer system where all the behavioral data received from the behavioral logic aggregators 104 as well as the system configuration templates 110 come together to execute a test. The automated test environment 112 may be a system of computers both physical and virtual, configured to execute a test case or multiple test cases. The configuration of the testing environment is controlled by the centralized control process system 108 based on the behavioral logic aggregators 104. Application data may be utilized to configure the system to mirror received behavioral data, so that the test case execution better represents a "real world" testing environment.

Figure 2:
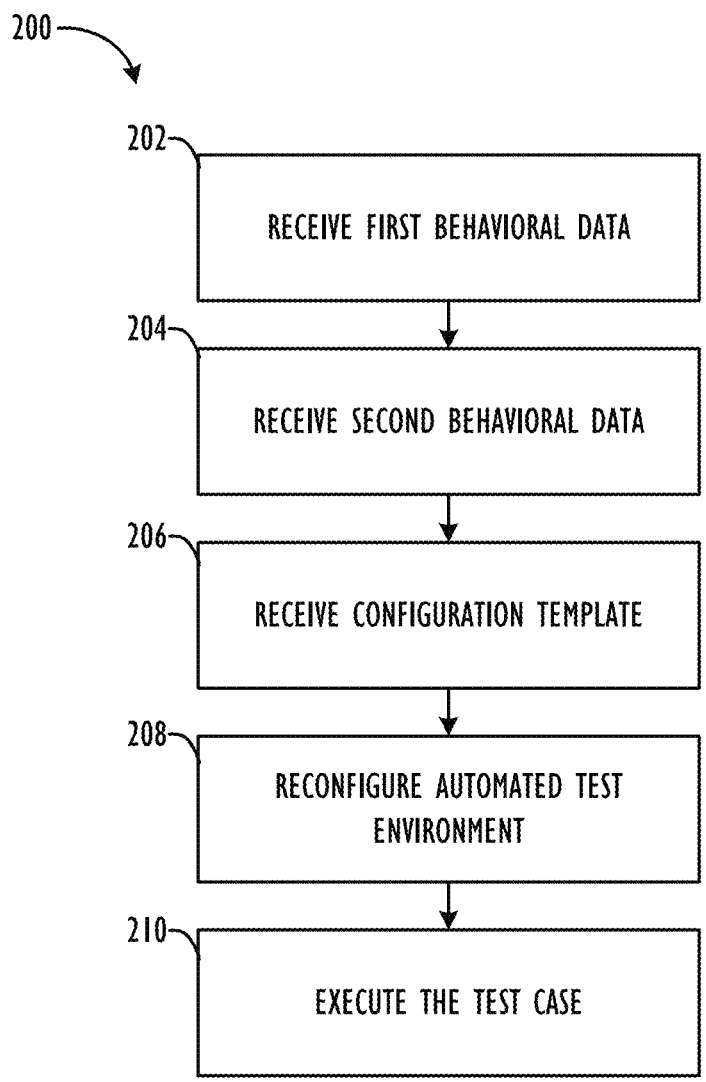
FIG. 2 is a flowchart illustrating a technique for executing a test case in a cloud assisted behavioral automated testing system according to one or more embodiments.

FIG. 2 is a flowchart 200 illustrating a technique for executing a test case in a cloud assisted behavioral automated testing system according to one or more embodiments. First, the BATS receives a first set of behavioral data 202. The first set of behavioral data corresponds to the data provided by the behavioral logic aggregators 104. This includes the less dynamic data sets including the application data, usage data, and threat data.

At block 204, the BATS receives a second behavioral data set. This is the URL/real time data set. The second behavioral set may be received frequently, and as close to real time as possible. In some embodiments, the second behavioral data may be received during a test case, requiring the test case to be re-executed.

At block 206, the BATS receives a system configuration template. The user persona indicated by the template defines the role of the expected user. The role then defines the application usage and the usage pattern. This may be accomplished through graphical user interface (GUI) testing tools that allow an automated process to provide input to a GUI. Alternatively, an automated process may provide input determined by the role via a command line interface (CLI). The automated process may be a part of the centralized control process system 108.

At block 208, the BATS reconfigures the automated test environment 112. The reconfiguring may include installing applications based on the application data and the usage data to better represent the sample set provided by the behavioral data collection services 102. For example, the reconfiguring of the automated test environment 112 may include installing a web browser at version 1.0 for half of the available machines, and the same web browser at version 2.0 for the remainder. The goal is provide a test environment that adequately represents the current state of the sampled set of devices from the behavioral data collection services.

At block 210, the BATS executes the test case. Executing the test case includes providing any test case input into the automated test environment 112 as defined by the test case. The input should include any URL/real time application data provided through the behavioral logic aggregators 104 to the centralized control process system 108. Upon the completion of the input, the automated test environment 112 may be queried for output. Alternatively the automated test environment 112 may provide the output to the centralize control process system 108 without a query. The centralized control process system 108 may utilize the resultant output from the automated test environment 112 to compare against an expected output. The test case may define a relationship or comparator between the expected output and the resultant output from the automated test environment 112 to determine success rate for the test case. The success rate may then be stored for later retrieval by a reporting system.

Figure 3:
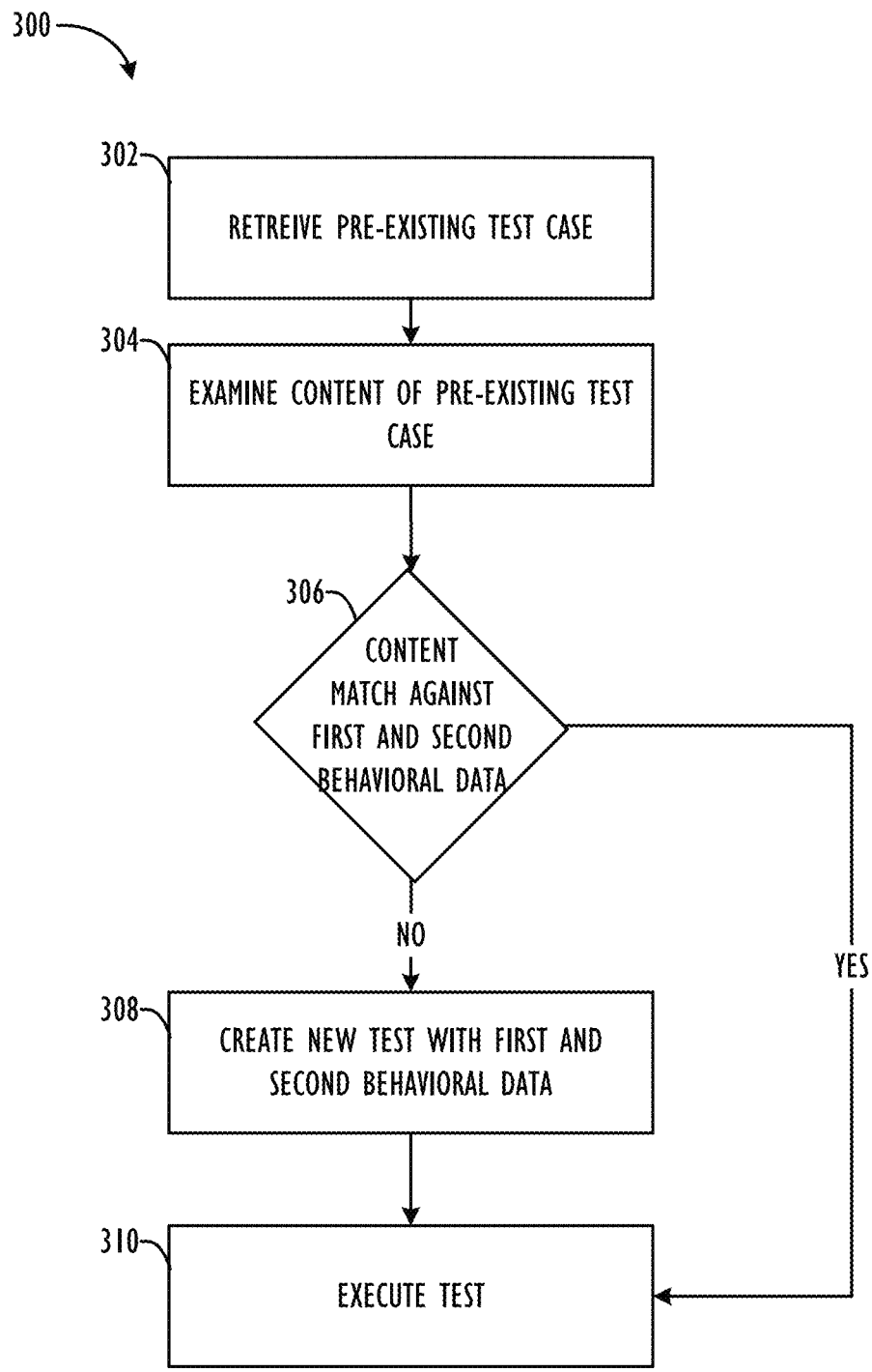
FIG. 3 is a flowchart illustrating a technique for updating a test case in a cloud assisted behavioral automated testing system according to one or more embodiment.

FIG. 3 is a flowchart 300 illustrating a technique for updating a test case in a cloud assisted behavioral automated testing system according to one or more embodiment. Flowchart 300 is an alternative embodiment of block 210.

At block 302, the BATS retrieves a pre-existing test case. Whether it be a regression test or a soak test, the pre-existing test case is one that existed in the repository 106 prior to this execution. As mentioned before, this may include the BATS querying a database, or retrieving the pre-existing test case from a flat file.

At block 304, the BATS examines the content of the pre-existing test case. Using the example from above, an XML implemented repository may facilitate the examination. As a well understood grammar, XML has many parsing libraries available that may facilitate the parsing of the test case repository 106. Similarly, parsing libraries often may offer member accessor functions into the structure of a parsed XML object. This may provide an interface between the BATS centralized control process system 108 and an XML implemented repository 106 for retrieving and examining test case fields. Alternately, the repository 106 may be implemented in a database such as MySQL. In that instance, the interface to retrieve and examine the content of the test case may be through a structured query language (SQL) request or whatever query language is used by the database.

At block 306, the BATS determines whether the content matches the first and second behavioral data. The centralized control process system 108 does a comparison between input fields for test cases against the first behavioral data set including the application data, usage data, and threat data. This may be as simple as a "diff" between the two fields, or may include more fuzzy logic, where the BATS intelligently determines whether the inputs match based on keyword matching. Additionally, the BATS also determines if the content of the second behavioral data, the URL/real time data, matches what is in the test case in a similar manner to the first behavioral data comparison.

At block 308, if both the first behavioral data and second behavioral data do not match the pre-existing test case content, the BATS may create a new test utilizing the first and second behavioral data as inputs. By creating a new test case, the BATS allows for a new use case to be tested, thereby exercising more of the system for potential problems. The new test case may be inserted into the repository 106 to become a part of a regression test suite, or a soak test.

At block 310, the paths of the pre-existing test case and the new test case converge where the BATS executes the test.

Figure 4:
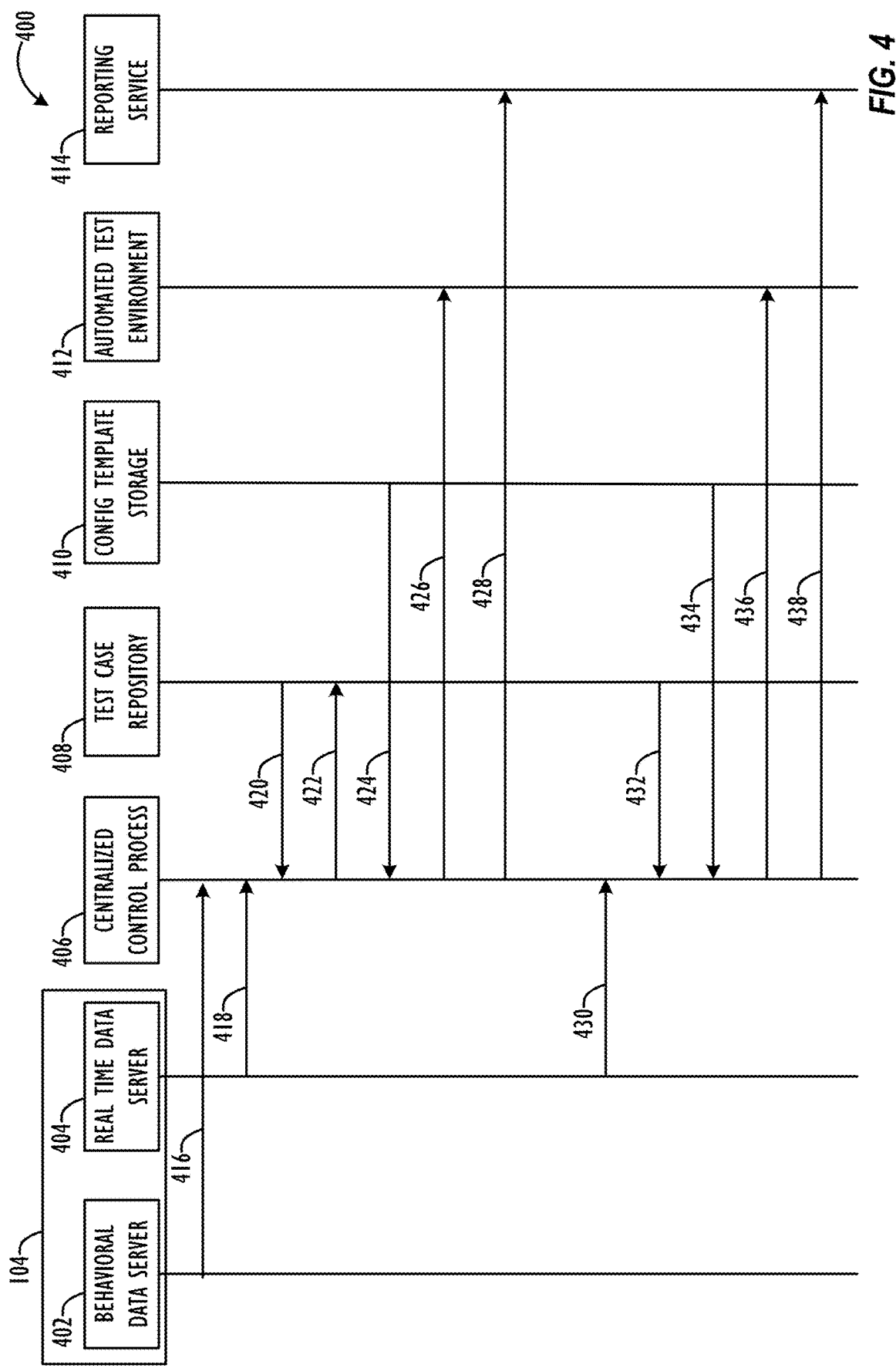
FIG. 4 is an activity diagram illustrating the execution of a test case in a cloud assisted behavioral automated testing system according to one or more embodiment.

FIG. 4 is an activity diagram 400 illustrating the execution of a test case in a cloud assisted behavioral automated testing system according to one or more embodiment. The activity diagram 400 illustrates the actions between parts of the system.

The behavioral data server 402 and the real time data server 404 are components to the behavioral logic aggregator 104. The behavioral data server 402 sends behavioral data 416 to the centralized control process 406. The real time data server 404 also send real time data 418 to the centralized control process 406. The centralized control process 406 collects both the sent behavioral data 416 and the sent real time data 418.

The test case repository 408 sends a test case 420 to the centralized control process 406. The centralized control process may exercise flowchart 300 utilizing the sent behavioral data 416 as the first behavioral data and the sent real time data 418 as the second behavioral data. In this example, the sent behavioral data 416 and the sent real time data 418 did not match the content of the sent test case 420. The centralized control process 406 then creates a new test case with the sent behavioral data 416 and the sent real time data 418 as fields defining the new test case. The centralized control process 406 then sends the new test case 422 to the test case repository 408 to be stored for later retrieval. System configuration template storage 410 sends a system configuration template 424 to the centralized control process 406.

The centralized control process 406 then utilizes the sent system configuration template 424, the sent behavioral data 416 and the sent real time data 418 to configure and execute the test 426 in the automated test environment 412. The centralized control process 406 determine the success or failure of the executed test 426 and sends the results 428 to a reporting service 414.

Since the real time data server 404 provides data on a more frequent basis, as mentioned above, the real time data server may send additional real time data 430, while the behavioral data server 402 does not, since the behavioral data does not aggregate as frequently as the real time data. Similar to before, the centralized control process 406 receives a different test case 432. As before, the centralized control process 406 may step through flowchart 300 to determine whether the combination of behavioral data and real time data match the received test case 432. In this example, no new test case is generated. The system configuration template storage 410 sends a different system configuration template 434 to the centralized control process 406. The centralized control process 406 then utilizes the sent different system configuration template 434, the sent behavioral data 416 and the sent additional real time data 430 to configure and execute the test 436 in the automated test environment 412. The centralized control process 406 then sends the results 438 to the reporting service 414.

Figure 5:
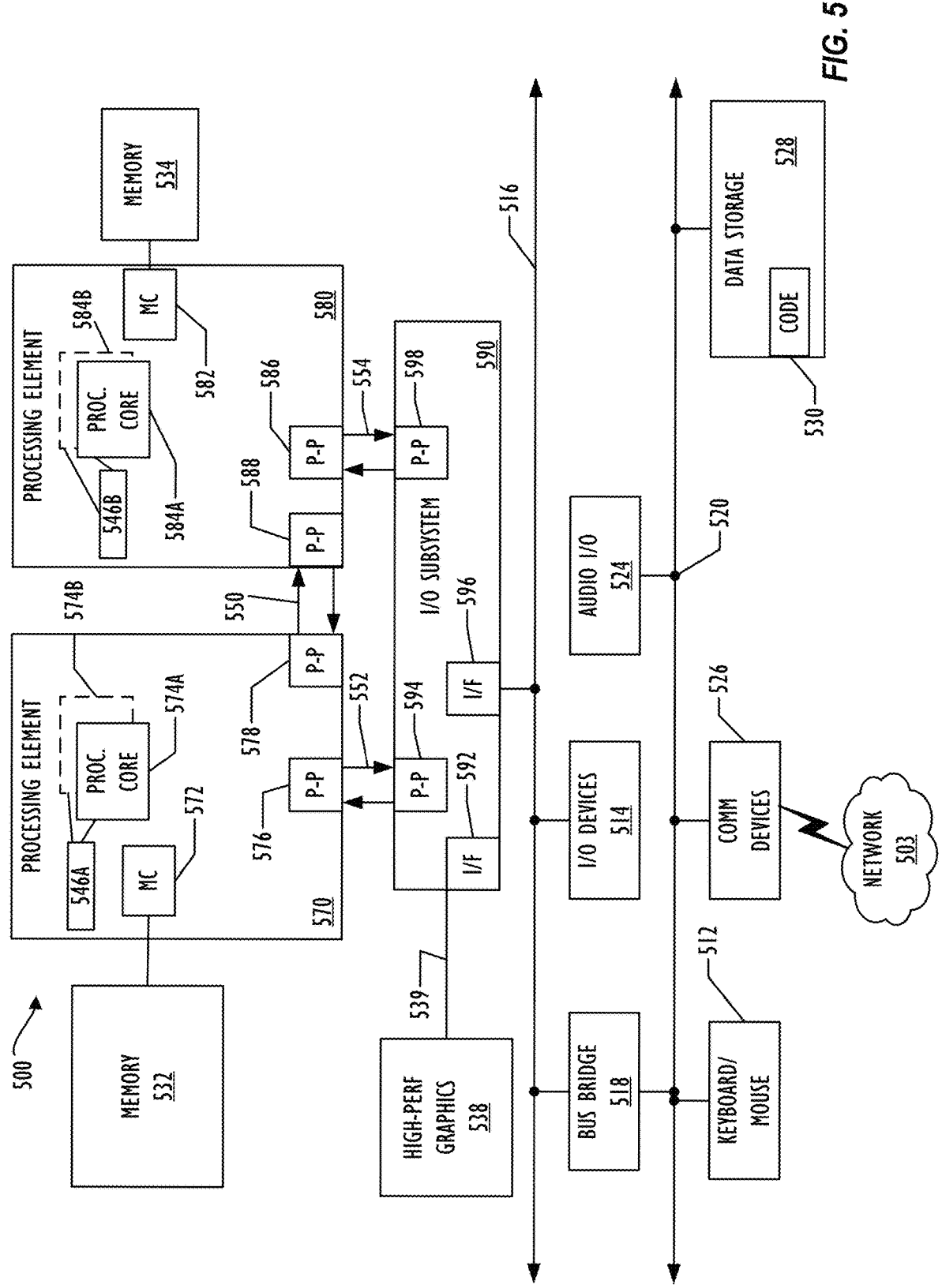
FIG. 5 is a block diagram illustrating an embodiment of a computing device for use with techniques described herein.

Referring now to FIG. 5, a block diagram illustrates a programmable device 500 that may be used for implementing the techniques described herein in accordance with one or more embodiments. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute computing instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., computing instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
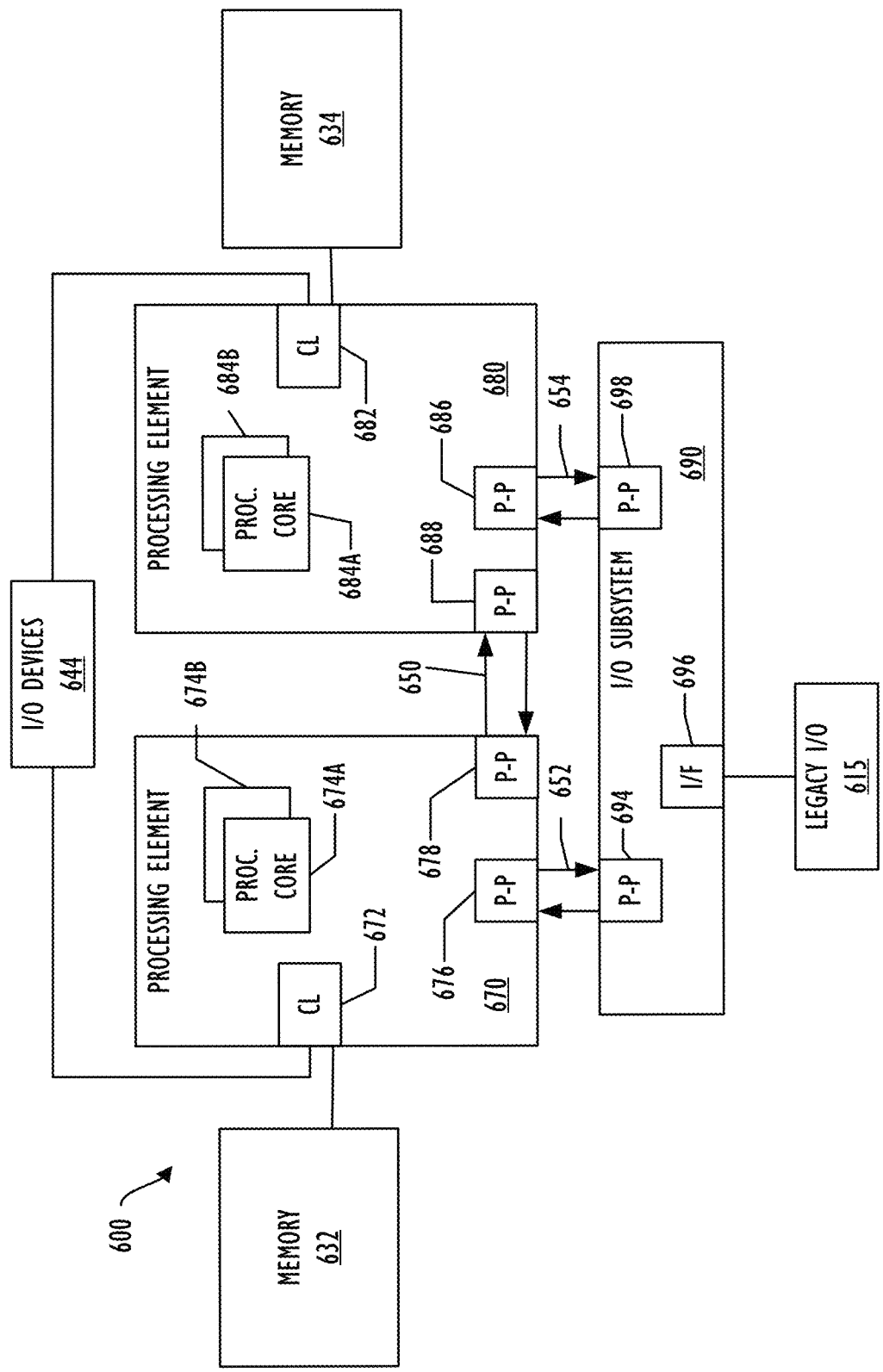
FIG. 6 is a block diagram illustrating another embodiment of computing device for use with techniques described herein.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The following examples pertain to further embodiments.

Example 1 is at least one computer readable medium on which is stored software for improving an automated test environment, comprising instructions that when executed cause a programmable device to: receive a first behavioral data and a second behavioral data, wherein the first behavioral data is collected periodically and the second behavioral data is collected in real time; receive a system configuration template based at least in part on at least one user persona; update a test case, based on the first behavioral data and the second behavioral data, reconfigure the automated test environment based on the first behavioral data, the second behavioral data, and the system configuration template; and execute the updated test case in the automated test environment, producing a test result.

In Example 2 the subject matter of Example 1 optionally includes wherein the instructions to update a test case comprise: retrieve a pre-existing test case from a repository; examine a content of the pre-existing test case; compare the content against the received first behavioral data and the second behavioral data; and create, responsive to the comparing, a new test case wherein the first behavioral data and second behavioral data are not referenced in the content.

In Example 3 the subject matter of Example 1 optionally includes wherein the instructions to execute the updated test cases comprise: determine an input data based on the updated test case; determine an input pattern based on the system configuration template; and provide the input data based on the input pattern to the automated test environment.

In Example 4 the subject matter of Example 3 optionally includes wherein the instructions to determine the input pattern comprise: evaluate a usage pattern associated with the system configuration template; and convert the usage patterns into a set of time periods associated with a set of data rates.

In Example 5 the subject matter of Example 1 optionally includes wherein the system configuration template is based in part on a behavioral pattern according to the at least one user persona.

In Example 6 the subject matter of Example 5 optionally includes wherein the at least one user persona is a consumer role.

In Example 7 the subject matter of any Examples 1-5 optionally includes wherein the first behavioral data comprises application data, usage data, and threat data.

In Example 8 the subject matter of Example 1 optionally includes wherein the instructions to reconfigure the automated test environment comprise updating an installed software stack in the automated test environment determined at least in part by the first behavioral data.

Example 9 is a system for improving an automated test environment comprising: a plurality of behavioral data collector systems; a plurality of behavioral logic aggregator systems communicatively coupled to the plurality of behavioral data collector systems; a plurality of automated test systems; a plurality of system configuration templates, based on at least one user persona and collected behavioral information; one or more processors communicatively coupled to the plurality of behavioral logic aggregator systems, the plurality of automated test systems, and the plurality of system configuration templates; memory coupled to the one or more processors on which are stored instructions, comprising instructions that when executed cause at least some of the one or more processors to: receive a first behavioral data and a second behavioral data from the plurality of behavioral logic aggregator systems, wherein the first behavioral data is collected periodically and the second behavioral data is collected in real time; receive a system configuration template from the plurality of system configuration templates; update a test case, based on the first behavioral data and the second behavioral data, reconfigure the plurality of automated test systems based on the first behavioral data, the second behavioral data, and the system configuration template; and execute the updated test case in the plurality of automated test systems, producing a test result.

In Example 10 the subject matter of Example 9 optionally includes wherein the instructions comprising instructions to update a test case comprise: retrieve a pre-existing test case from a repository; examine a content of the pre-existing test case; compare the content against the received first behavioral data and the second behavioral data; and create, responsive to the comparing, a new test case wherein the first behavioral data and second behavioral data are not referenced in the content.

In Example 11 the subject matter of Example 9 optionally includes wherein the instructions comprising instructions to execute the updated test cases comprise: determine an input data based on the updated test case; determine an input pattern based on the system configuration template; and provide the input data based on the input pattern to the plurality of automated test systems.

In Example 12 the subject matter of Example 11 optionally includes wherein the instructions comprising instructions to determine the input pattern comprise: evaluate a usage pattern associated with the system configuration template; and convert the usage patterns into a set of time periods associated with a set of data rates.

In Example 13 the subject matter of Example 9 optionally includes wherein the system configuration template is based in part on a behavioral pattern according to the at least one user persona.

In Example 14 the subject matter of Example 13 optionally includes wherein the at least one user persona is a consumer role.

In Example 15 the subject matter of any of Example 9-13 optionally includes wherein the first behavioral data comprises application data, usage data, and threat data.

In Example 16 the subject matter of Example 9 optionally includes wherein the instructions comprising instructions to reconfigure the automated test environment comprise updating an installed software stack in the automated test environment determined at least in part by the first behavioral data.

Example 17 is a method for improving an automated test environment, comprising: receiving a first behavioral data and a second behavioral data, wherein the first behavioral data is collected periodically and the second behavioral data is collected in real time; receiving a system configuration template based at least in part on at least one user persona; updating a test case, based on the first behavioral data and the second behavioral data, reconfiguring the automated test environment based on the first behavioral data, the second behavioral data, and the system configuration template; and executing the updated test case in the automated test environment, producing a test result.

In Example 18 the subject matter of Example 17 optionally includes wherein the updating a test case comprises: retrieving a pre-existing test case from a repository; examining a content of the pre-existing test case; comparing the content against the received first behavioral data and the second behavioral data; and creating, responsive to the comparing, a new test case wherein the first behavioral data and second behavioral data are not referenced in the content.

In Example 19 the subject matter of Example 17 optionally includes wherein the executing the updated test cases comprise: determine an input data based on the updated test case; determine an input pattern based on the system configuration template; and provide the input data based on the input pattern to the automated test environment.

In Example 20 the subject matter of Example 17 optionally includes wherein the reconfiguring of the automated test environment comprises updating an installed software stack in the automated test environment determined at least in part by the first behavioral data.

Example 21 is an apparatus comprising: a processor; and a memory coupled with the processor, on which are stored instructions, comprising instructions that when executed cause the processor to: receive a first behavioral data and a second behavioral data, wherein the first behavioral data is collected periodically and the second behavioral data is collected in real time; receive a system configuration template based at least in part on at least one user persona; update a test case, based on the first behavioral data and the second behavioral data, reconfigure an automated test environment based on the first behavioral data, the second behavioral data, and the system configuration template; and execute the updated test case in the automated test environment, producing a test result.

In Example 22 the subject matter of Example 21 optionally includes wherein the instructions comprising instructions that when executed cause the processor to update a test case comprise: retrieve a pre-existing test case from a repository; examine a content of the pre-existing test case; compare the content against the received first behavioral data and the second behavioral data; and create, responsive to the comparing, a new test case wherein the first behavioral data and second behavioral data are not referenced in the content.

In Example 23 the subject matter of Example 21 optionally includes wherein the instructions comprising instructions that when executed cause the processor to execute the updated test cases comprise: determine an input data based on the updated test case; determine an input pattern based on the system configuration template; and provide the input data based on the input pattern to the automated test environment.

In Example 24 the subject matter of Example 23 optionally includes wherein the instructions comprising instructions that when executed cause the processor to determine the input pattern comprise: evaluate a usage pattern associated with the system configuration template; and convert the usage patterns into a set of time periods associated with a set of data rates.

In Example 25 the subject matter of Example 21 optionally includes wherein the system configuration template is based in part on a behavioral pattern according to the at least one user persona.

In Example 26 the subject matter of Example 25 optionally includes wherein the at least one user persona is a consumer role.

In Example 27 the subject matter of any Example 21-25 optionally includes wherein the first behavioral data comprises application data, usage data, and threat data.

In Example 28 the subject matter of Example 21 optionally includes wherein the instructions comprising instructions that when executed cause the processor to reconfigure the automated test environment comprise updating an installed software stack in the automated test environment determined at least in part by the first behavioral data.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one computer readable storage device comprising instructions that, when executed, cause at least one processor to, at least:
    access a test case corresponding to test environment settings, the test environment settings associated with first behavioral data corresponding to a first time;
    determine a first application type installed on computing devices of a test environment, the first application type corresponding to the first behavioral data;
    acquire second behavioral data during a second time;
    determine whether a threshold quantity of the computing devices corresponding to the second behavioral data corresponds to a second application type; and
    when the threshold quantity of the computing devices corresponds to the second application type, reconfigure the computing devices of the test environment to execute the second application type.

2. The at least one computer readable storage device as defined in claim 1, wherein the instructions, when executed, cause the at least one processor to determine a version type corresponding to the first application type and the second application type.

3. The at least one computer readable storage device as defined in claim 2, wherein the instructions, when executed, cause the at least one processor to reconfigure the version type based on the second application type when the threshold quantity of the computing devices corresponds to the second application type.

4. The at least one computer readable storage device as defined in claim 1, wherein the instructions, when executed, cause the at least one processor to access the test case from a repository storing a plurality of pre-existing test cases.

5. The at least one computer readable storage device as defined in claim 4, wherein the instructions, when executed, cause the at least one processor to generate a new test case based on the reconfigured computing devices, the new test case stored in the repository.

6. The at least one computer readable storage device as defined in claim 1, wherein the instructions, when executed, cause the at least one processor to evaluate a usage pattern corresponding to a configuration template.

7. The at least one computer readable storage device as defined in claim 6, wherein the instructions, when executed, cause the at least one processor to convert the usage pattern into a set of time periods associated with a set of data rates.

8. A system to reconfigure computing devices of a test environment, comprising:
    at least one processor;
    memory, coupled to the at least one processor, on which is stored instructions that, when executed, cause the at least one processor to:
    access a test case corresponding to test environment settings, the test environment settings associated with first behavioral data corresponding to a first time;
    determine a first application type installed on computing devices of a test environment, the first application type corresponding to the first behavioral data;
    acquire second behavioral data during a second time;
    determine whether a threshold quantity of the computing devices corresponding to the second behavioral data corresponds to a second application type; and when the threshold quantity of the computing devices corresponds to the second application type, reconfigure the computing devices of the test environment to execute the second application type.

9. The system as defined in claim 8, wherein the at least one processor is to determine a version type corresponding to the first application type and the second application type.

10. The system as defined in claim 9, wherein the at least one processor is to reconfigure the version type based on the second application type when the threshold quantity of the computing devices corresponds to the second application type.

11. The system as defined in claim 8, wherein the at least one processor is to access the test case from a repository storing a plurality of pre-existing test cases.

12. The system as defined in claim 11, wherein the at least one processor is to generate a new test case based on the reconfigured computing devices, the new test case stored in the repository.

13. The system as defined in claim 8, wherein the at least one processor is to evaluate a usage pattern corresponding to a configuration template.

14. The system as defined in claim 13, wherein the at least one processor is to convert the usage pattern into a set of time periods associated with a set of data rates.

15. A computer-implemented method to reconfigure computing devices of a test environment, the method comprising:
    access, by executing an instruction with at least one processor, a test case corresponding to test environment settings, the test environment settings associated with first behavioral data corresponding to a first time;
    determine, by executing an instruction with the at least one processor, a first application type installed on computing devices of a test environment, the first application type corresponding to the first behavioral data;
    acquire, by executing an instruction with the at least one processor, second behavioral data during a second time;
    determine, by executing an instruction with the at least one processor, whether a threshold quantity of the computing devices corresponding to the second behavioral data corresponds to a second application type; and
    when the threshold quantity of the computing devices corresponds to the second application type, reconfigure, by executing an instruction with the at least one processor, the computing devices of the test environment to execute the second application type.

16. The method as defined in claim 15, further including determining a version type corresponding to the first application type and the second application type.

17. The method as defined in claim 16, further including reconfiguring the version type based on the second application type when the threshold quantity of the computing devices corresponds to the second application type.

18. The method as defined in claim 15, further including accessing the test case from a repository storing a plurality of pre-existing test cases.

19. The method as defined in claim 18, further including generating a new test case based on the reconfigured computing devices, the new test case stored in the repository.

20. The method as defined in claim 15, further including evaluating a usage pattern corresponding to a configuration template.

21. The method as defined in claim 20, further including converting the usage pattern into a set of time periods associated with a set of data rates.

* * * * *